(12) United States Patent
LaPolla

(10) Patent No.: US 7,950,707 B1
(45) Date of Patent: May 31, 2011

(54) SANITARY COLLECTION APPARATUS FOR PET FECES AND ASSOCIATED METHOD

(76) Inventor: John LaPolla, Bradenton, FL (US)

( * ) Notice: Subject to any disclaimer, the term of this patent is extended or adjusted under 35 U.S.C. 154(b) by 335 days.

(21) Appl. No.: 12/220,541

(22) Filed: Jul. 23, 2008

Related U.S. Application Data

(60) Provisional application No. 60/963,391, filed on Aug. 6, 2007.

(51) Int. Cl.
*A01K 29/00* (2006.01)
(52) U.S. Cl. ............................................. 294/1.5
(58) Field of Classification Search ............ 294/1.3, 294/1.4, 1.5; 119/802–804, 161; 248/99
See application file for complete search history.

(56) References Cited

U.S. PATENT DOCUMENTS

| | | | | |
|---|---|---|---|---|
| 3,777,708 A * | 12/1973 | Vogt | ............................. | 294/1.5 |
| 4,103,953 A * | 8/1978 | Lachance | ......................... | 294/1.4 |
| 4,363,508 A * | 12/1982 | Duke | ............................... | 294/1.5 |
| 5,403,050 A | 4/1995 | Searing | | |
| 5,779,290 A * | 7/1998 | Wilke | ............................... | 294/1.5 |
| 6,039,370 A | 3/2000 | Dooley, Jr. | | |
| 6,386,606 B1 * | 5/2002 | Marshall | ......................... | 294/1.5 |
| 6,485,073 B2 | 11/2002 | Harrison | | |
| 7,431,361 B2 * | 10/2008 | Pilas | ............................... | 294/1.5 |
| 2002/0096895 A1 * | 7/2002 | McCarthy | ....................... | 294/1.5 |

* cited by examiner

*Primary Examiner* — Dean J Kramer

(57) ABSTRACT

A hand-operable feces collection apparatus for catching animal excrements prior to reaching a ground surface may include an elongated curvilinear handle and an annular ring attached to a distal end thereof. A retention bag may be attached directly to the annular ring in such a manner that the retention bag is maintained at a substantially stable position while receiving the animal excrements therein. The apparatus may also include a mechanism for resiliently adjusting a diameter of the annular ring such that the retention bag is caused to automatically disengage the annular ring. Such a mechanism may be activated by a lever attached to the proximal end of the handle. The annular ring may be composed of a semi-circular solid male core and a hollow female sleeve. The male core is urged along the female sleeve as the mechanism is activated, causing the diameter of the annular ring to adjust.

12 Claims, 8 Drawing Sheets

SANITARY COLLECTION APPARATUS FOR PET FECES AND ASSOCIATED METHOD

CROSS REFERENCE TO RELATED APPLICATIONS

This application claims the benefit of U.S. Provisional Application No. 60/963,391, filed Aug. 6, 2007, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to animal waste and, more particularly, to hand-operable feces collection apparatus for catching animal excrements prior to reaching a ground surface.

2. Prior Art

The waste or feces left by domestic animals and pets is unsightly, and more importantly, often presents a health hazard. A growing pet population has heightened the public need to properly dispose of such feces. To promote clean public streets and areas, many governmental municipalities, especially those in urban areas have enacted strict ordinances that require the pet owner to collect and properly dispose of the feces or face large fines. Various types of pet feces sanitation devices have been developed in an attempt to provide an efficient and convenient way to comply with such ordinances.

Prior art examples have presented certain problems that have limited their usefulness to pet owners. Some collection apparatuses that utilize movable paddles or scoops are often cumbersome to use and unsanitary, often causing embarrassment and discomfort to users. Other examples require the purchase of specific disposable receptacles which is inconvenient and sometimes costly. Some assemblies are too heavy and easily tire the arms of a user as they are carried while taking the pet for a walk. Assemblies that include numerous structural elements, linkages, etc., complicate operation, increase fabrication and assembly costs, and are more prone to failure and breakage.

U.S. Pat. No. 5,403,050 to Searing discloses a sanitary device for collecting and disposing of canine fecal matter. The device uses a scooper device with a disposable bag which is formed from a bag blank. The bag blank has a collection portion on the upper surface, and a closure device for closing a bag formed therefrom. The closure device is attached to the periphery of the lower surface. During use the scooper device maintains the collection portion of the bag blank in a substantially flat condition. The bag blank, upon mounting for use, substantially covers and protects the scooper device from soilage. After canine feces are collected on the surface of the bag blank, the bag is formed by operating the scooper device and then is securely closing it to form a disposable bag. Unfortunately, this prior art reference does not provide an easily adjustable end to allow use with animals of different sizes.

U.S. Pat. No. 6,039,370 to Dooley, Jr. discloses a portable pet toilet device having an elongated pole having first and second ends. The first end provides a handle. Securely mounted on the second end of the pole is a pair of selectively adjustable arms for supporting a disposable receptacle. The arms are adjustable in order to provide the capability of accommodating receptacles of different sizes and shape. Unfortunately, this prior art reference does not provide a curvilinear handle to allow the user to not have to bend over, and to remain at a farther distance from the unpleasant animal waste.

U.S. Pat. No. 6,485,073 to Harrison discloses a shovel and bag assembly for scooping animal refuse deposited by a pet animal. The shovel comprises a handle, a spaded loop including a spade with a protruding leading edge, a first and second support arm for the spade, a base, and a first and second extended corner. The spade and the two extended corners are configured to affix and tension the bag in an open configuration. The extended corners may each comprise a shoulder that assists in tensioning and holding the bag. After scooping the animal refuse into the bag, a rear pocket of the bag is inverted over a forward pocket, covering the soiled forward section and sealing the bag for disposal. Unfortunately, this prior art reference requires the user to scoop the animal waste off of the ground, thereby making it more difficult to remove all of the waste. This often results in a messier process.

Accordingly, a need remains for a hand-operable feces collection apparatus in order to overcome the above-noted shortcomings. The present invention satisfies such a need by providing an apparatus that is convenient and easy to use, is durable yet lightweight in design, is versatile in its applications, and facilitates the easy retrieval of dog waste.

BRIEF SUMMARY OF THE INVENTION

In view of the foregoing background, it is therefore an object of the present invention to provide an apparatus for assisting a user to quickly and easily clean up after pets. These and other objects, features, and advantages of the invention are provided by a sanitary collection apparatus for pet feces.

A hand-operable feces collection apparatus for catching animal excrements prior to reaching a ground surface may include an elongated curvilinear handle and an annular ring attached to a distal end thereof. Such a curvilinear handle allows the user to stand back and away from the animal during use so as to keep the unpleasant animal feces at a greater distance from the user. The annular ring preferably has open top and bottom surfaces such that a hollow passageway is transversely defined through an inner perimeter thereof.

A retention bag may be attached directly to the annular ring in such a manner that the retention bag is maintained at a substantially stable position while receiving the animal excrements therein. The retention bag allows for convenient, hands-free capture of the feces in a readily disposable form. The retention bag preferably has an attached draw string for adapting the retention bag between open and closed positions. Such a draw string seals the bag tight, so as to close in the unpleasant smell of the animal waste. The retention bag may be configured in such a manner that a user may detach the retention bag from the annular ring while maintaining both hands spaced away from the retention bag. This prevents physical contact with the animal waste and the spread of harmful microorganisms, thereby also promoting sanitation. The animal excrement preferably is prohibited from landing on the ground surface and remains confined within the retention bag during collection procedures.

The hand-operable collection apparatus may further include a mechanism for resiliently adjusting a diameter of the annular ring such that the retention bag is caused to automatically disengage the annular ring and freely fall downwardly through the hollow passageway. The resiliently adjusting mechanism is preferably manually actuated by the user and enables the user to discard the retention bag without directly contacting the animal excrements. The user may easily lift the collection apparatus with the handle and release the retention bag into an appropriate waste receptacle. The user preferably remains spaced apart from the annular ring while actuating the resiliently adjusting mechanism.

The resiliently adjusting mechanism may further include a rectilinear track connected directly to a proximal end of the curvilinear handle. The resiliently adjusting mechanism may also include a lever slidably abutted to the track. Such a lever is preferably configured in such a manner that the lever may be reciprocated therealong while the user maintains a grip at the proximal end of the curvilinear handle.

The resiliently adjusting mechanism may include a plurality of rings positioned about the curvilinear handle and juxtaposed along a longitudinal length thereof. Also, the resiliently adjusting mechanism may include a resiliently elastic cable formed from flexible material. Such a resiliently elastic cable is preferably interfitted through each of the rings in such a manner that the resiliently elastic cable is freely reciprocated through the rings while remaining proximately disposed adjacent to the curvilinear handle respectively. Placement of the resiliently elastic cable adjacent to the curvilinear handle allows the apparatus to remain compact and easily placed in storage.

The annular ring may further include a semi-circular hollow female sleeve directly coupled to a distal end of the curvilinear handle and extending downwardly away therefrom. Such hollow female sleeve may have first and second opposed open ends protruding away from the curvilinear handle. The annular ring also may include a semi-circular solid male core engaged about the hollow female sleeve. The hollow female sleeve and the solid male core may collectively define a circumference of the annular ring.

The resiliently elastic cable may further include a bifurcated distal end that preferably has first and second diverging regions extending away from the distal end of the curvilinear handle. Each of such first and second diverging regions may penetrate the hollow female sleeve through an opening on the posterior side of the annular ring. The first and second diverging regions preferably travels along mutually exclusive arcuate paths defined inside and along partial circumferential lengths of the hollow female sleeves.

Further, each of the first and second diverging regions may be fixedly anchored to a corresponding end of the solid male core and arranged in such a manner that the solid male core is urged along the hollow female sleeve when the lever is reciprocated along a linear path. The ends of the solid male core may be displaced towards and away from the distal end of the curvilinear handle based upon corresponding proximal and distal displacement of the lever to thereby decrease and increase the diameter of the annular ring respectively.

The retention bag may further include an arcuate edge formed along a top-most opening thereof and traveling along an entire circumference of the retention bag. Such an arcuate edge is preferably pliant and adjustably engaged about an entire circumference of the annular ring wherein a closed bottom end of the retention bag is passed through the hollow passageway and suspended below the annular ring. The arcuate edge may be entirely displaced and separated from the annular ring when the solid male core is telescopically displaced along the hollow female sleeve while traveling towards the distal end of the curvilinear handle so that the retention bag is automatically dropped through the hollow passageway while remaining spaced from the user.

By providing a clean and practical method of collection, the present invention makes the unpleasant task of collecting animal feces simple, quick, hands free and thus, more sanitary. In addition, the convenient extendable design of the assembly handle allows users to gather dog waste without having to bend over or stoop on their knees. The durable design provides for many years of repeated use and enjoyment for animal lovers. This benefit proves especially important for dog lovers who suffer limited mobility, arthritis, knee problems or back pain. As an environmentally friendly invention, use of the apparatus helps to keep neighborhood sidewalks, parks and their landscape clean and free of unwanted debris. Additionally, because the present invention is designed to collect all eliminated waste, unpleasant physical and odoriferous residue which otherwise remains when the waste falls to the ground, is effectively eliminated.

In use, a method for the collection of animal excrements prior to reach a ground surface may include the first step of providing an elongated curvilinear handle and providing and attaching an annular ring to a distal end of the curvilinear handle. The annular ring preferably has open top and bottom surfaces such that a hollow passageway is transversely defined through an inner perimeter thereof. The second step of the feces collection method preferably includes providing and attaching a retention bag directly to the annular ring in such a manner that the retention bag is maintained at a substantially stable position while receiving the animal excrements therein. The retention bag may have a draw string attached thereto for adapting the retention bag between open and closed positions.

The method may include a third step of positioning the retention bag in a pathway of the animal excrement. Fourthly, the feces collection method may entail catching the animal excrements in the retention bag. A fifth step preferably includes detaching the retention bag from the annular ring while maintaining both user hands spaced away from the retention bag. Finally, the feces collection method may include prohibiting the animal excrement from landing on the ground surface by maintaining the animal excrements confined within the retention bag during collection procedures.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
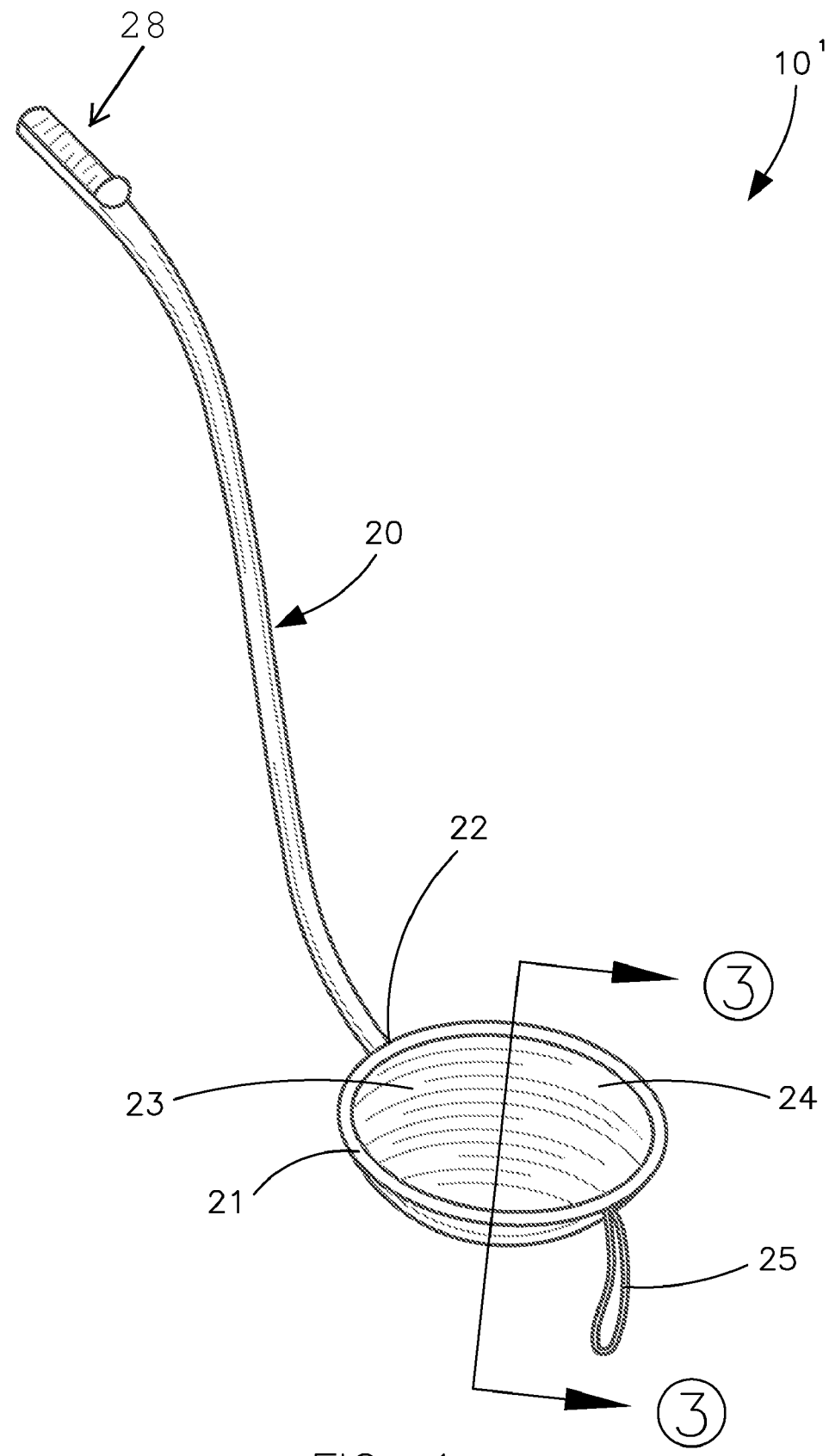
FIG. 1 is a perspective view showing a hand-operable feces collection apparatus, in accordance with an alternate embodiment of the present invention.
Figure 2A:
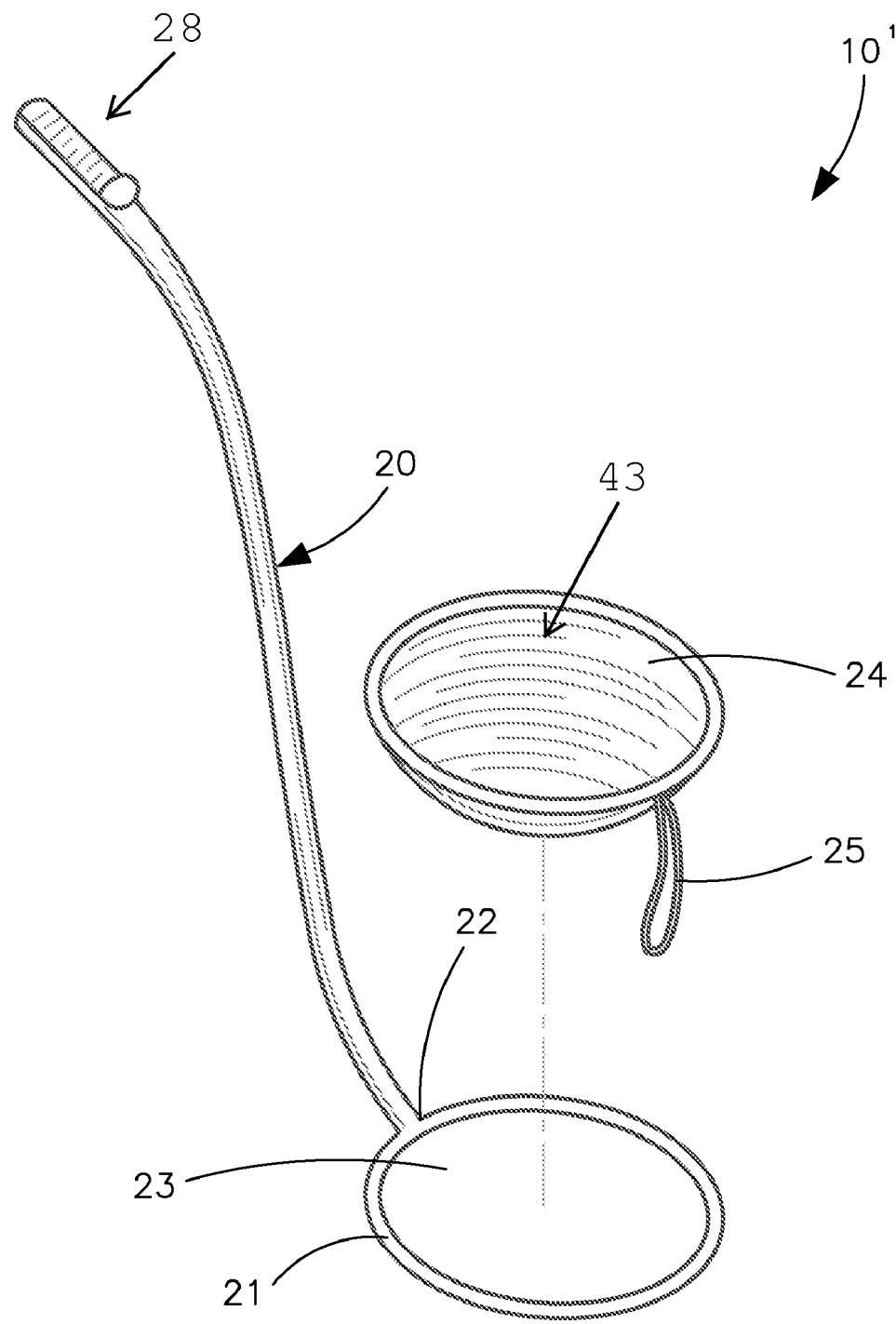
FIG. 2A is a perspective view showing a retention bag removed from the annular ring of the present invention and adapted to an open position, in accordance with an alternative embodiment of the present invention.
Figure 2B:
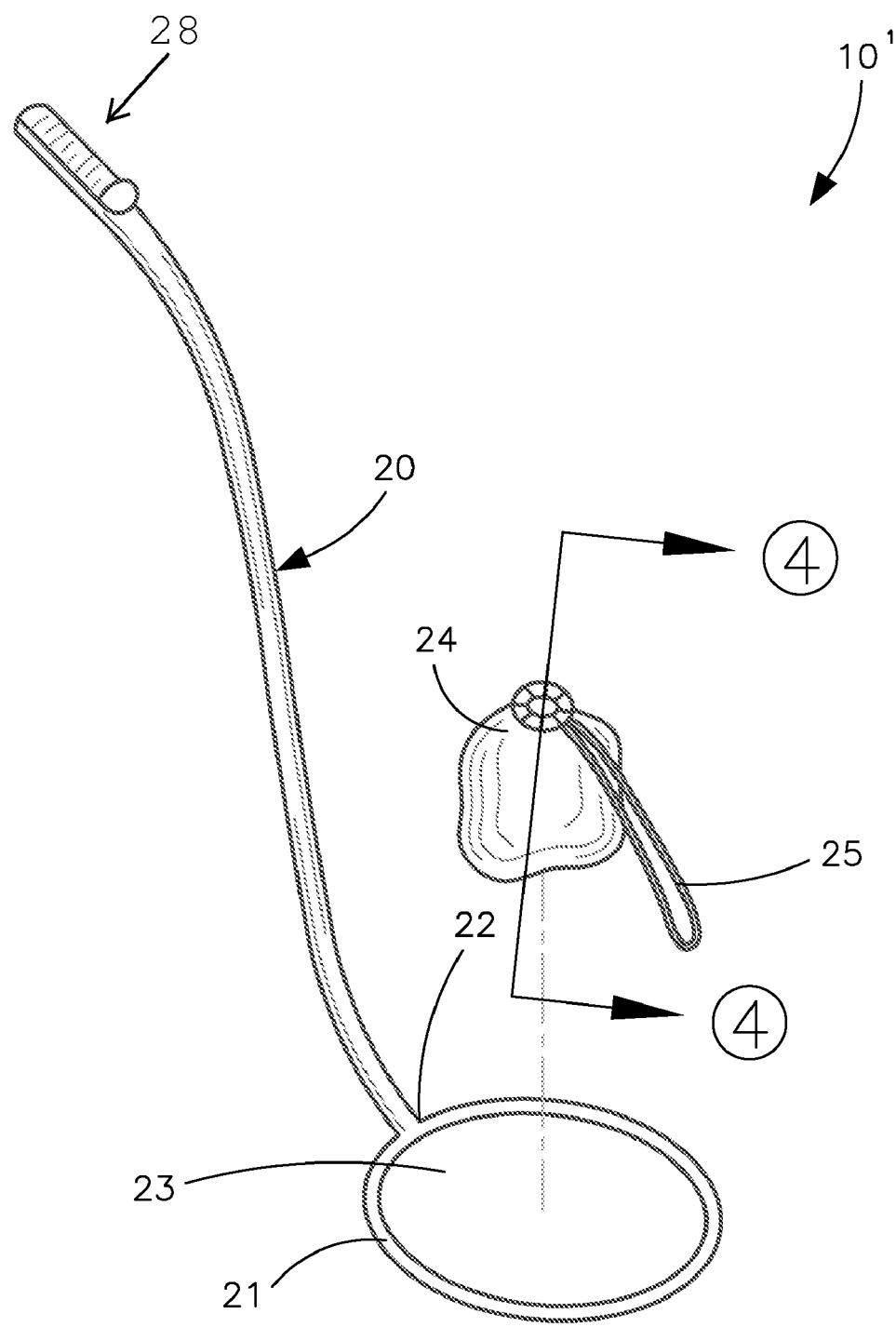
FIG. 2B is a perspective view showing a retention bag removed from the annular ring of the present invention and adapted to a closed position, in accordance with an alternative embodiment of the present invention.
Figure 3:
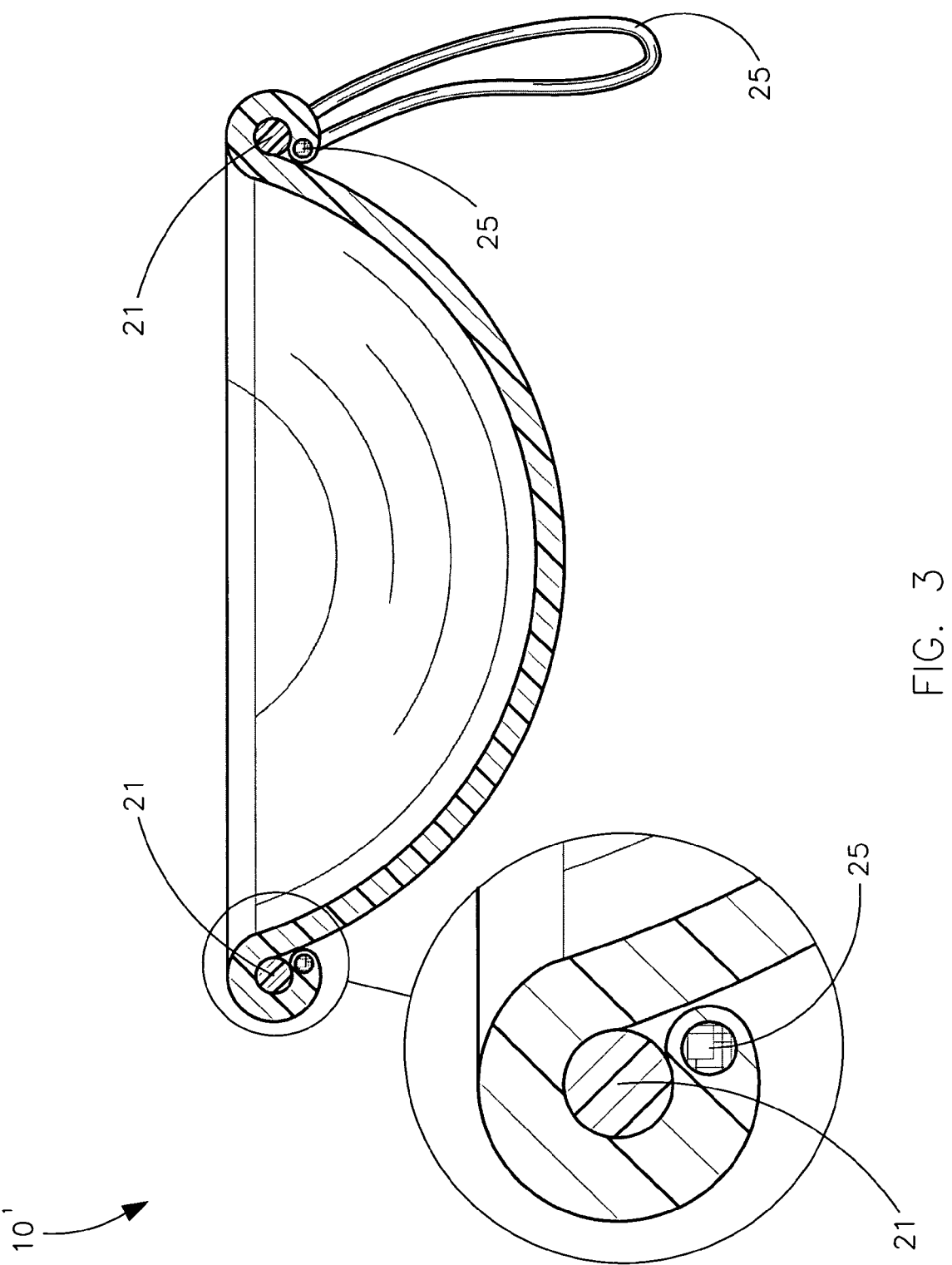
FIG. 3 is a cross sectional view showing the retention bag attached to the annular ring, taken along line 3-3, as seen in FIG. 1, in accordance with an alternative embodiment of the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The apparatus of this invention is referred to generally in FIGS. 1-5B by the reference numeral 10 and is intended to provide a hand-operable feces collection apparatus. It should be understood that the apparatus 10 may be used to for catching the excrements of many different types of animals prior to reaching the ground surface and should not be limited in use to the applications mentioned herein Referring initially to FIGS. 1-6, the present invention may be manufactured in alternate embodiments. The preferred embodiment of a hand-operable feces collection apparatus 10 is referred to in FIGS. 5A, 5B, and 6 while an alternate embodiment of the apparatus 10' is referred to in FIGS. 1, 2A, 2B, and 3. It should be noted that different embodiments of the present invention may include some identical elements.

Referring to FIGS. 1-6, both embodiments of a hand-operable feces collection apparatus 10, 10' for catching animal excrements prior to reaching a ground surface may include an elongated curvilinear handle 20 and an annular ring 21 attached to a distal end thereof 22. Such a curvilinear handle 20 allows the user to stand back and away from the animal during use so as to keep the unpleasant animal feces at a greater distance from the user. The annular ring 21 preferably has open top and bottom surfaces such that a hollow passageway 23 is transversely defined through an inner perimeter thereof.

Referring to FIGS. 1-5A and 6, in both embodiments of the apparatus 10, 10', a retention bag 24 may be attached directly to the annular ring without the use of intervening elements in such a manner that the retention bag 24 is maintained at a substantially stable position while receiving the animal excrements therein. The retention bag 24 allows for convenient, hands-free capture of the feces in a readily disposable form. The retention bag 24 preferably has an attached draw string 25 for adapting the retention bag 24 between open and closed positions. Such a draw string 25 seals the bag tight, so as to close in the unpleasant smell of the animal waste. The drawstring 25 also provides an effective means of carrying the retention bag 24 that contains animal waste.

Referring to FIGS. 1-5a, in both embodiments of the present invention, the retention bag 24 may be configured in such a manner that a user may detach the retention bag 24 from the annular ring 21 while maintaining both hands spaced away from the retention bag 24. This prevents physical contact with the animal waste and the spread of harmful microorganisms, thereby also promoting sanitation. The animal excrement is preferably prevented from coming into contact on the ground surface and remains confined within the retention bag 24 during collection procedures.

Figure 5A:
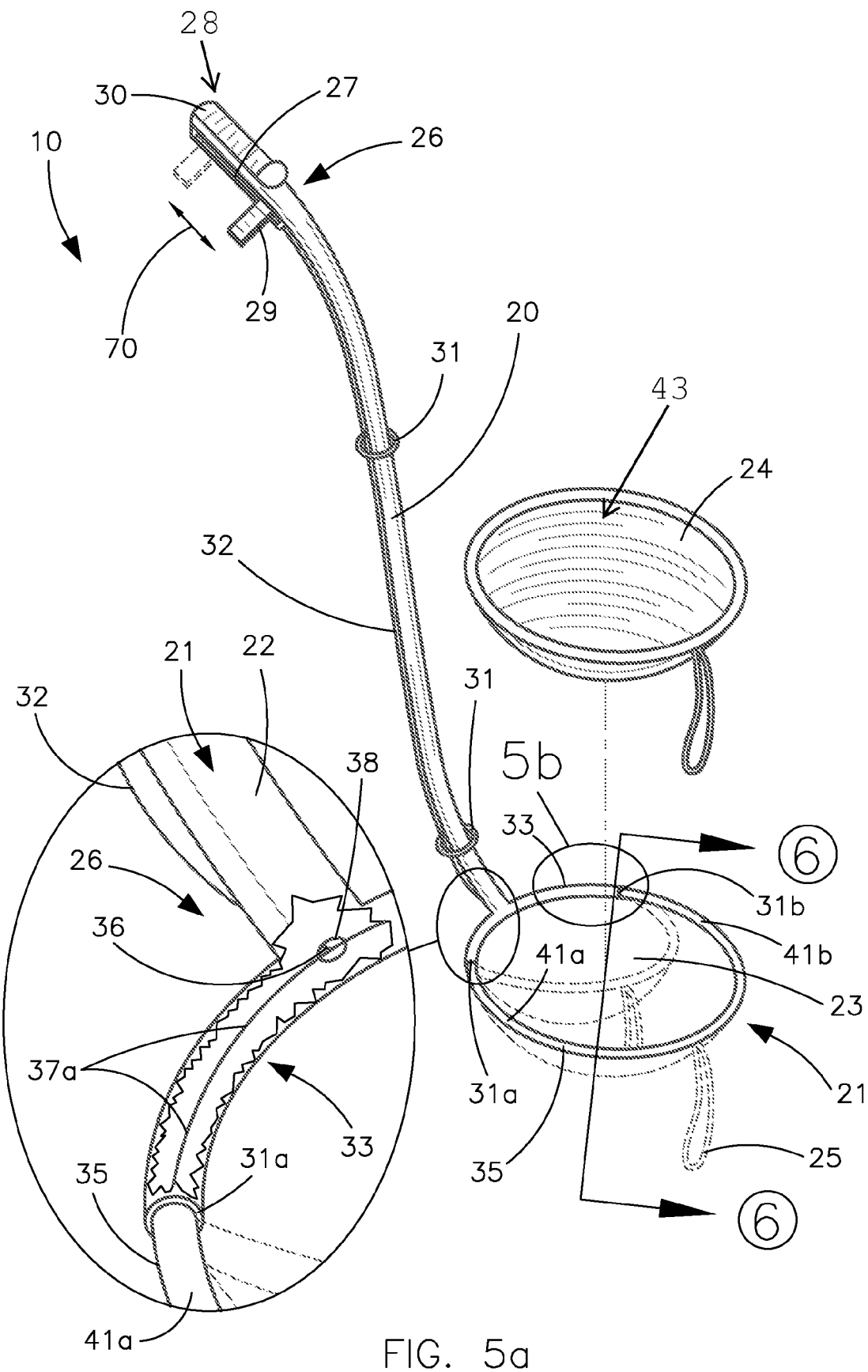
FIG. 5A is a break away view of the annular ring showing a detail of bifurcated distal ends of the resiliently elastic cable within the partial circumferential lengths of the hollow female core as such the distal end attaches to the solid male core, in accordance with the preferred embodiment of the present invention.
Figure 5B:
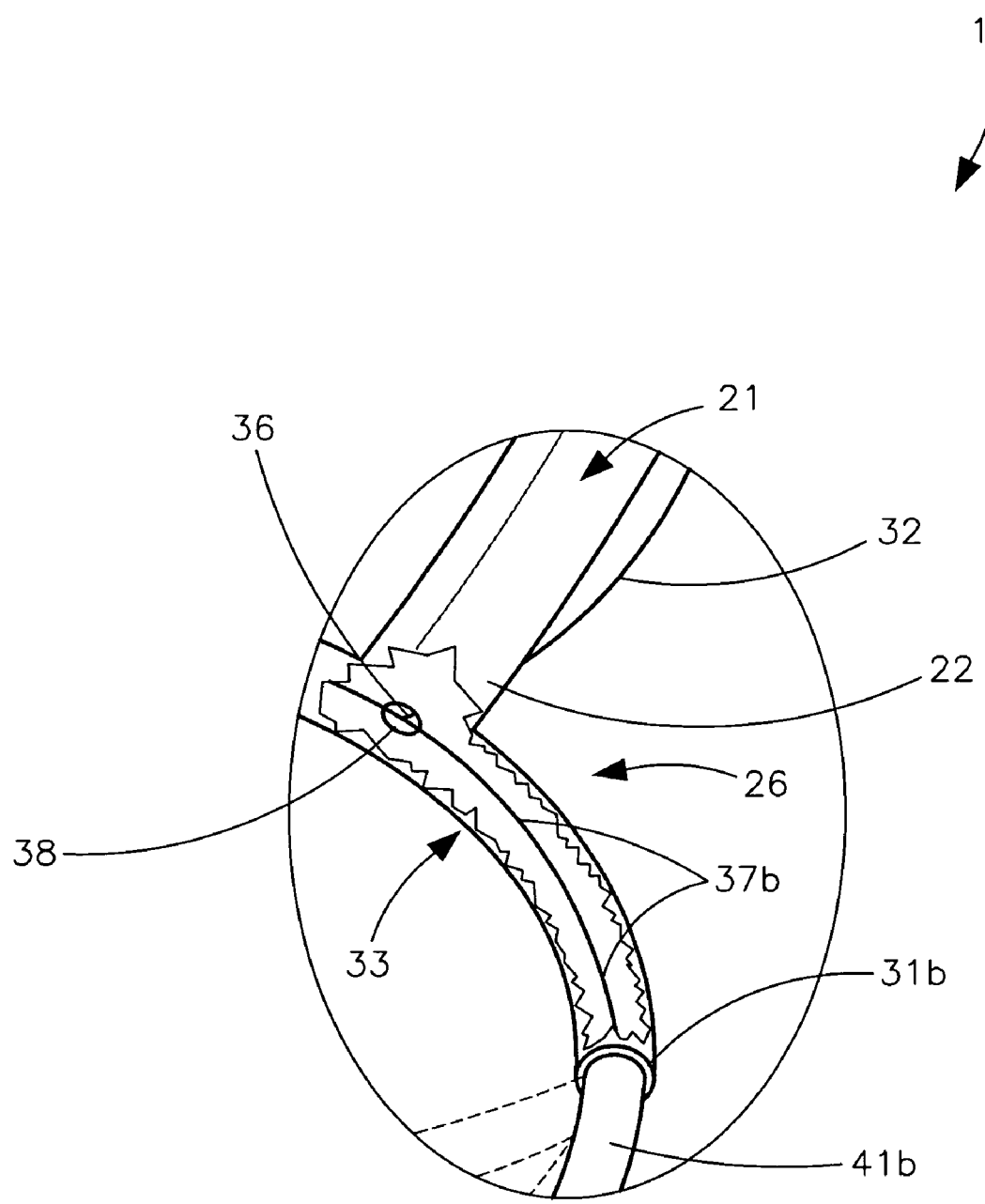
FIG. 5B is an exploded view of a hollow female sleeve and a solid male core, taken from 5B, as seen in FIG. 5A, in accordance with the preferred embodiment of the present invention.
Figure 6:
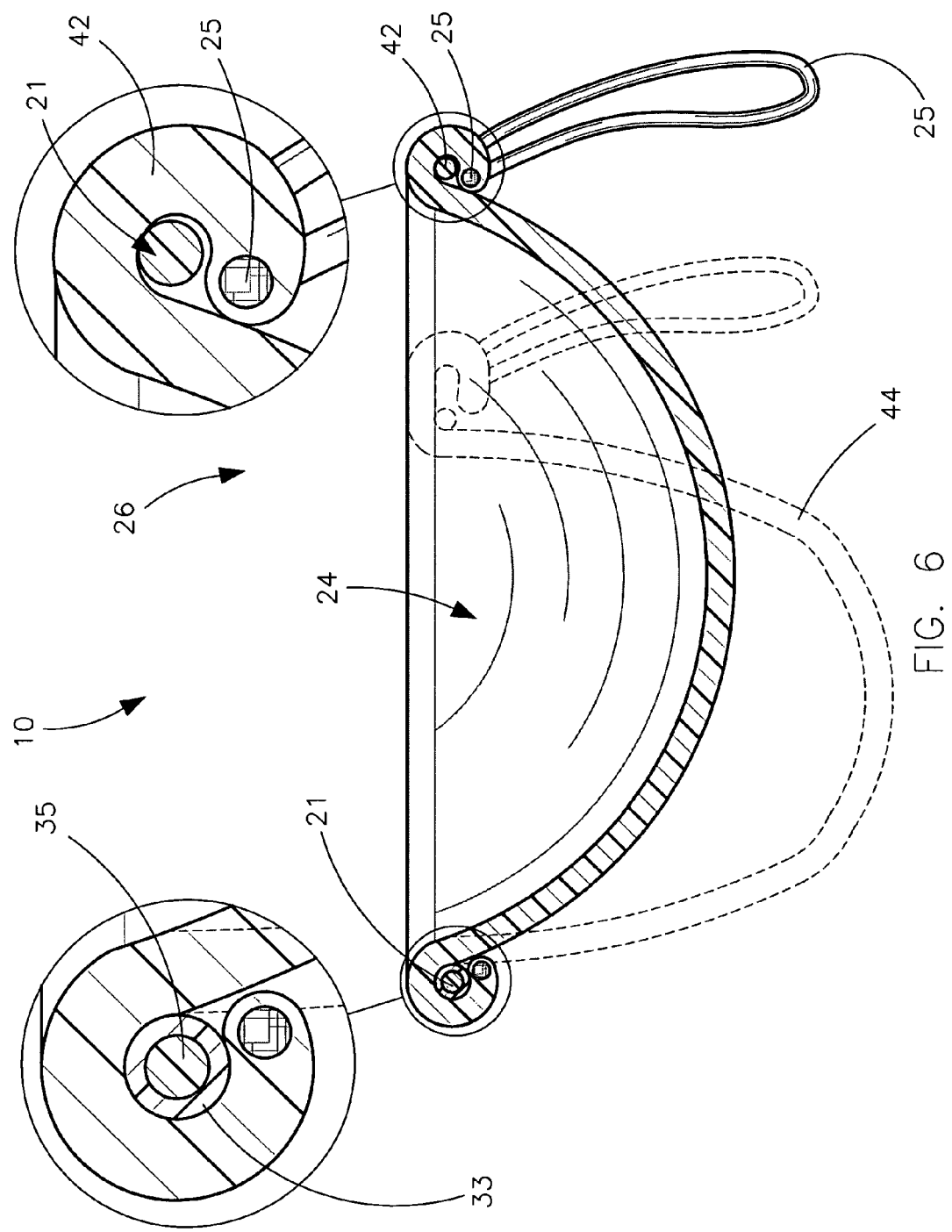
FIG. 6 is a cross sectional view showing the retention bag attached to the annular ring composed of a hollow female sleeve and a solid male core, taken along line 6-6, as seen in FIG. 5A, in accordance with the preferred embodiment of the present invention.

Referring to FIGS. 5A-6, in the preferred embodiment of the apparatus 10, the hand-operable collection apparatus 10 may further include a mechanism 26 for resiliently adjusting a diameter of the annular ring 21 such that a retention bag 24 is caused to automatically disengage the annular ring and freely fall downwardly through a hollow passageway 23. The resiliently adjusting mechanism 26 is preferably manually actuated by the user and enables the user to discard the retention bag without directly contacting the animal excrements. The user may easily lift the collection apparatus 10 with the handle 20 and release the retention bag 24 into an appropriate waste receptacle. The combined elements of the retention bag 24 and the annular ring 21 provide a means for removing the retention bag 24 from the annular ring 21 while making minimal contact with the retention bag 24. In this manner the user preferably remains spaced apart from the annular ring while actuating the resiliently adjusting mechanism.

Referring to FIGS. 5A-6, in the preferred embodiment of the apparatus 10, the resiliently adjusting mechanism 26 may further include a rectilinear track 27 connected directly without the use of intervening elements to a proximal end 28 of the curvilinear handle 20. The resiliently adjusting mechanism 26 may also include a lever 29 slidably abutted to the track 27. Such a lever 29 is preferably configured in such a manner that the lever 29 may be reciprocated along a first linear path 70 while the user maintains a grip at the proximal end 30 of the curvilinear handle 20. The placement of the lever 29 provides the unexpected benefit of allowing the user to operate the resiliently adjusting mechanism 26 with one hand, thereby freeing up the user's other hand to hold the animal's leash.

Referring again to FIGS. 5A-6, in the preferred embodiment of the apparatus 10, the resiliently adjusting mechanism 26 may further include a plurality of rings 31 positioned about the curvilinear handle 20 and juxtaposed along a longitudinal length thereof. Also, the resiliently adjusting mechanism 26 may include a resiliently elastic cable 32 formed from flexible material. Of course, such a resiliently elastic cable 32 may be formed of various different types of flexible materials, as is obvious to one ordinarily skilled in the art. The resiliently elastic cable 32 is preferably interfitted through each of the rings 31 which is vital so that resiliently elastic cable 32 is freely reciprocated through the rings 31 while remaining proximately disposed adjacent to the curvilinear handle 20 respectively. Placement of the resiliently elastic cable 32 adjacent to the curvilinear handle 20 provides the benefit of allowing apparatus 10 to remain compact and easily placed in storage.

Referring to FIGS. 5-6, in the preferred embodiment of the apparatus 10, the annular ring 21 may further include a semi-circular hollow female sleeve 33 directly coupled without the use of intervening elements to a distal end 22 of the curvilinear handle 20 and extending downwardly away therefrom. Such a hollow female sleeve 33 may have first 31A and second 31B opposed open ends protruding away from the curvilinear handle 20. The annular ring 21 may also include a semi-circular solid male core 35 engaged about the hollow female sleeve 33. The hollow female sleeve 33 and the solid male core 35 may collectively define a circumference of the annular ring 21. The hollow female sleeve 33 and solid male core 35 may preferably be formed from resilient material and may maintain a telescoping relationship along respective non-linear longitudinal lengths thereof. This telescoping relationship allows the apparatus 10 to easily adjust the opening size of the retention bag 24 to fit for animals of differing sizes.

Referring to FIGS. 5-6, in the preferred embodiment of the apparatus 10, the resiliently elastic cable 32 may further include a bifurcated distal end 36 that preferably has first 37A and second 37B diverging regions extending away from the distal end 22 of the curvilinear handle 20. Each first 37A and second 37B diverging regions may penetrate the hollow female sleeve 33 through an opening 38 in a posterior side of the annular ring 21. The first 37A and second 37B diverging regions preferably travels along mutually exclusive arcuate paths defined inside and along partial circumferential lengths of the hollow female sleeves 33.

Further, first 37A and second 37B diverging regions may be fixedly anchored to a corresponding end 41A, 41B of the solid male core 35 and arranged in such a manner that the solid male core 35 is urged along the hollow female sleeve 33 when the lever 29 is reciprocated along a linear path 70. The ends 41A, 41B of the solid male core 35 may be displaced towards and away from the distal end 22 of the curvilinear handle 20 based upon corresponding proximal and distal displacement of the lever 29 to thereby decrease and increase the diameter of the annular ring 21 respectively. The combination of such claimed elements provides the unexpected benefit of enabling the user to adjust the diameter of the annular ring 21 for different sized animals or for disengaging the retention bag 24 with a hands free means. In this manner, the user may avoid coming into contact with both the retention bag 24 as well as the surface of the annular ring 21, both of which may be contaminated.

Figure 4:
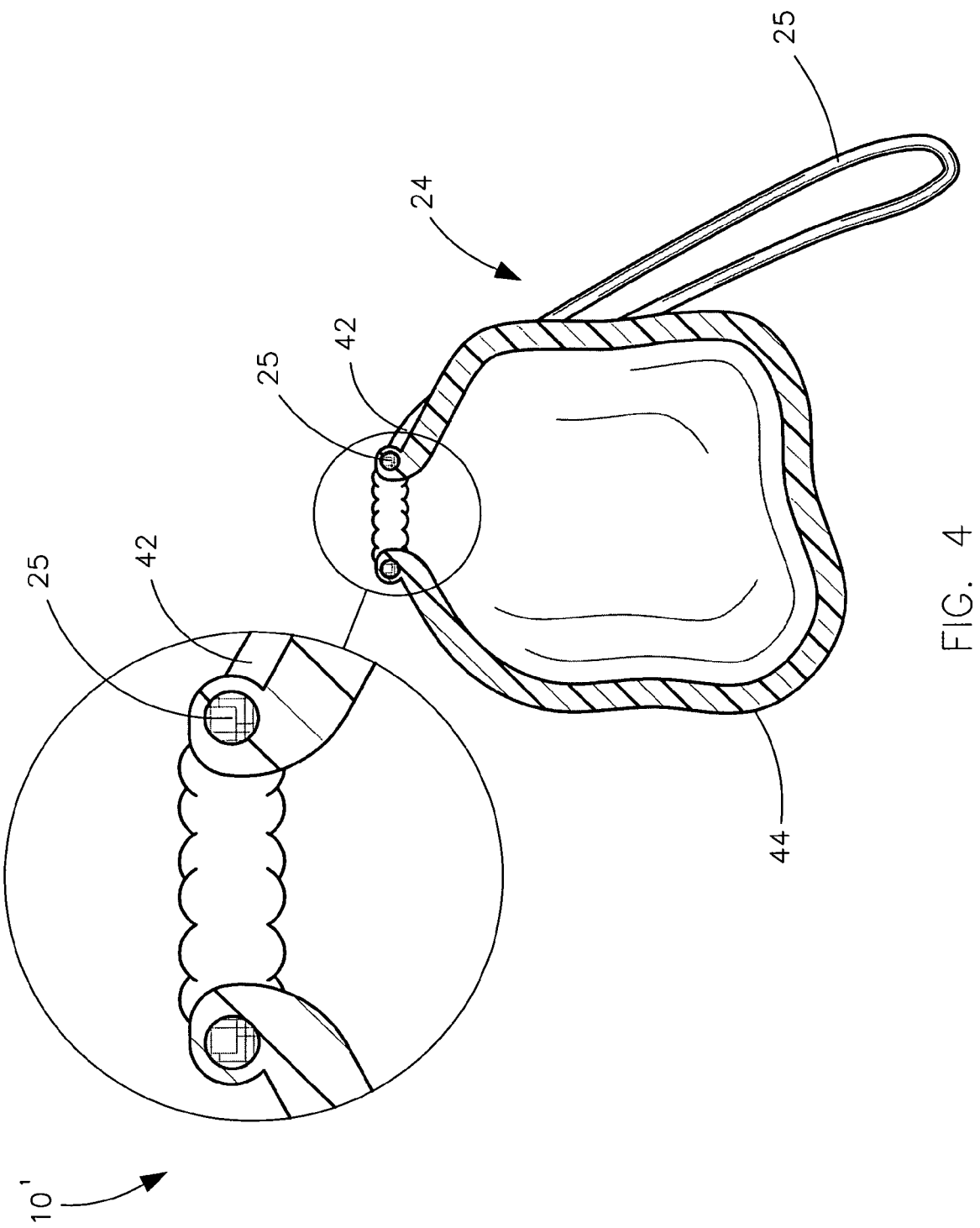
FIG. 4 is a cross sectional view showing the retention bag adapted to a closed position, taken along line 4-4, as seen in FIG. 2B.

Referring to FIGS. 4-6, in the preferred embodiment of the apparatus 10, the retention bag 24 may further include an arcuate edge 42 formed along a top-most opening 43 thereof and traveling along an entire circumference of the retention bag 24. Such an arcuate edge 42 is preferably pliant and adjustably engaged about an entire circumference of the annular ring 24 wherein a closed bottom end 44 of the retention bag 24 is passed through the hollow passageway 23 and suspended below the annular ring 21.

The arcuate edge 42 may be entirely displaced and separated from the annular ring 21 when the solid male core 35 is telescopically displaced into the hollow female sleeve 33 while traveling towards the distal end 22 of the curvilinear handle 20 so that the retention bag 24 is automatically dropped through the hollow passageway 23 while remaining spaced from the user. The unique configuration of the arcuate edge 42 in conjunction with the adjustable annular ring 21 provides the benefit of enabling the user to close and remove the retention bag 24 without having to contact the edge of such bag.

In use, an additional purpose of the present invention is to provide a feces collection method for catching animal excrements prior to reaching a ground surface. The method may include the first step of providing an elongated curvilinear handle 20 and providing and attaching an annular ring 21 to a distal end 22 of curvilinear handle 20. The annular ring 20 preferably has open top and bottom surfaces such that a hollow passageway 23 is transversely defined through an inner perimeter thereof. The second step of the feces collection method preferably includes providing and attaching a retention bag 24 directly and without the use of intervening elements to the annular ring 21 in such a manner that the retention bag 24 is maintained at a substantially stable position while receiving the animal excrements therein which is vital for preventing the animal excrements from reaching the ground surface. The retention bag 24 may have a draw string 25 attached thereto for adapting the retention bag 24 between open and closed positions.

In use, the method may further include a third step of positioning the retention bag 24 in a pathway of the animal excrement, which, due to the convenient length of the curvilinear handle 20, does not require the user to uncomfortably bend close to the ground. Fourthly, the feces collection method may entail catching the animal excrements in the retention bag 24. A fifth step preferably includes detaching the retention bag 24 from the annular ring 21 while maintaining both user hands spaced away from the retention bag. Finally, the feces collection method may include prohibiting the animal excrement from landing on the ground surface by maintaining the animal excrements confined within the retention bag 24 during collection procedures.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A hand-operable feces collection apparatus for catching animal excrements prior to reaching a ground surface, said hand-operable feces collection apparatus comprising:
   an elongated curvilinear handle;
   an annular ring attached to a distal end of said curvilinear handle, said annular ring having open top and bottom surfaces such that a hollow passageway is transversely defined through an inner perimeter thereof; and
   a retention bag attached directly to said annular ring in such a manner that said retention bag is maintained at a substantially stable position while receiving the animal excrements therein;

wherein said retention bag is configured in such a manner that a user may detach said retention bag from said annular ring while maintaining both hands spaced away from said retention bag;

wherein the animal excrement is prohibited from landing on the ground surface and remains confined within said retention bag during collection procedures;

means for resiliently adjusting a diameter of said annular ring such that said retention bag is caused to automatically disengage said annular ring and freely fall downwardly through said hollow passageway;

wherein said resiliently adjusting means is manually actuated by the user and enables the user to discard said retention bag without directly contacting the animal excrements;

wherein the user remains spaced apart from said annular ring while said resiliently adjusting means is actuated by the user.

2. The hand-operable collection apparatus of claim 1, wherein said resiliently adjusting means comprises:

a rectilinear track connected directly to a proximal end of said curvilinear handle;

a lever slidably abutted to said track and being configured in such a manner that said lever is reciprocated therealong while the user maintains a grip at said proximal end of said curvilinear handle;

a plurality of rings positioned about said curvilinear handle and juxtaposed along a longitudinal length thereof; and a resiliently elastic cable formed from flexible material, said resiliently elastic cable being interfitted through each of said rings in such a manner that said resiliently elastic cable is freely reciprocated through said rings while remaining proximately disposed adjacent to said curvilinear handle respectively.

3. The hand-operable collection apparatus of claim 2, where said annular ring comprises:

a semi-circular hollow female sleeve directly coupled to a distal end of said curvilinear handle and extending downwardly away therefrom, said hollow female sleeve having first and second opposed open ends protruding away from said curvilinear handle; and a semi-circular solid male core positioned within said hollow female sleeve, said hollow female sleeve and said solid male core collectively define a circumference of said annular ring;

wherein each of said hollow female sleeve and said solid male core are formed from resilient material and maintain a telescoping relationship along respective non-linear longitudinal lengths thereof.

4. The hand-operable collection apparatus of claim 3, wherein said resiliently elastic cable comprises: a bifurcated distal end having first and second diverging regions extending away from said distal end of said curvilinear handle, each of said first and second diverging regions traveling along mutually exclusive arcuate paths defined along partial circumferential lengths of said hollow female sleeve, each of said first and second diverging regions being fixedly anchored to a corresponding end of said solid male core and arranged in such a manner that said solid male core is urged along said hollow female sleeve when said lever is reciprocated along a linear path, said ends of said solid male core being displaced towards and away from said distal end of said curvilinear handle based upon corresponding proximal and distal displacement of said lever to thereby decrease and increase said diameter of said annular ring respectively.

5. The hand-operable collection apparatus of claim 4, where said retention bag comprises: an arcuate edge formed along a top-most opening thereof and traveling along an entire circumference of said retention bag, said arcuate edge being pliant and adjustably engaged about an entire circumference of said annular ring wherein a closed bottom end of said retention bag is passed through said hollow passageway and suspended below said annular ring.

6. The hand-operable collection apparatus of claim 5, wherein said arcuate edge is entirely displaced and separated from said annular ring when said solid male core is telescopically displaced along said hollow female sleeve while traveling towards said distal end of said curvilinear handle so that said retention bag is automatically dropped through said hollow passageway while remaining spaced from the user.

7. A hand-operable feces collection apparatus for catching animal excrements prior to reaching a ground surface, said hand-operable feces collection apparatus comprising:

an elongated curvilinear handle;

an annular ring attached to a distal end of said curvilinear handle, said annular ring having open top and bottom surfaces such that a hollow passageway is transversely defined through an inner perimeter thereof; and a retention bag attached directly to said annular ring in such a manner that said retention bag is maintained at a substantially stable position while receiving the animal excrements therein, said retention bag having a draw string attached thereto for adapting said retention bag between open and closed positions;

wherein said retention bag is configured in such a manner that a user may detach said retention bag from said annular ring while maintaining both hands spaced away from said retention bag;

wherein the animal excrement is prohibited from landing on the ground surface and remains confined within said retention bag during collection procedures;

means for resiliently adjusting a diameter of said annular ring such that said retention bag is caused to automatically disengage said annular ring and freely fall downwardly through said hollow passageway;

wherein said resiliently adjusting means is manually actuated by the user and enables the user to discard said retention bag without directly contacting the animal excrements;

wherein the user remains spaced apart from said annular ring while said resiliently adjusting means is actuated by the user.

8. The hand-operable collection apparatus of claim 7, wherein said resiliently adjusting means comprises:

a rectilinear track connected directly to a proximal end of said curvilinear handle;

a lever slidably abutted to said track and being configured in such a manner that said lever is reciprocated therealong while the user maintains a grip at said proximal end of said curvilinear handle;

a plurality of rings positioned about said curvilinear handle and juxtaposed along a longitudinal length thereof; and a resiliently elastic cable formed from flexible material, said resiliently elastic cable being interfitted through each of said rings in such a manner that said resiliently elastic cable is freely reciprocated through said rings while remaining proximately disposed adjacent to said curvilinear handle respectively.

9. The hand-operable collection apparatus of claim 8, where said annular ring comprises:

a semi-circular hollow female sleeve directly coupled to a distal end of said curvilinear handle and extending downwardly away therefrom, said hollow female sleeve having first and second opposed open ends protruding away from said curvilinear handle; and a semi-circular solid male core engaged about said hollow female sleeve, said solid male core and said hollow female sleeve collectively define a circumference of said annular ring;

wherein each of said hollow female sleeve and said solid male core are formed from resilient material and maintain a telescoping relationship along respective non-linear longitudinal lengths thereof.

10. The hand-operable collection apparatus of claim 9, wherein said resiliently elastic cable comprises: a bifurcated distal end having first and second diverging regions extending away from said distal end of said curvilinear handle, each of said first and second diverging regions traveling along mutually exclusive arcuate paths defined along partial circumferential lengths of said hollow female sleeve, each of said first and second diverging regions being fixedly anchored to a corresponding end of said solid male core and arranged in such a manner that said solid male core is urged along said hollow female sleeve when said lever is reciprocated along a linear path, said ends of said solid male core being displaced towards and away from said distal end of said curvilinear handle based upon corresponding proximal and distal displacement of said lever to thereby decrease and increase said diameter of said annular ring respectively.

11. The hand-operable collection apparatus of claim 10, where said retention bag comprises: an arcuate edge formed along a top-most opening thereof and traveling along an entire circumference of said retention bag, said arcuate edge being pliant and adjustably engaged about an entire circumference of said annular ring wherein a closed bottom end of said retention bag is passed through said hollow passageway and suspended below said annular ring.

12. The hand-operable collection apparatus of claim 11, wherein said arcuate edge is entirely displaced and separated from said annular ring when said solid male core is telescopically displaced along said hollow female sleeve while traveling towards said distal end of said curvilinear handle so that said retention bag is automatically dropped through said hollow passageway while remaining spaced from the user.

* * * * *